March 16, 1926.  M. RUBLE  1,576,676
CUTTER
Filed March 23, 1925
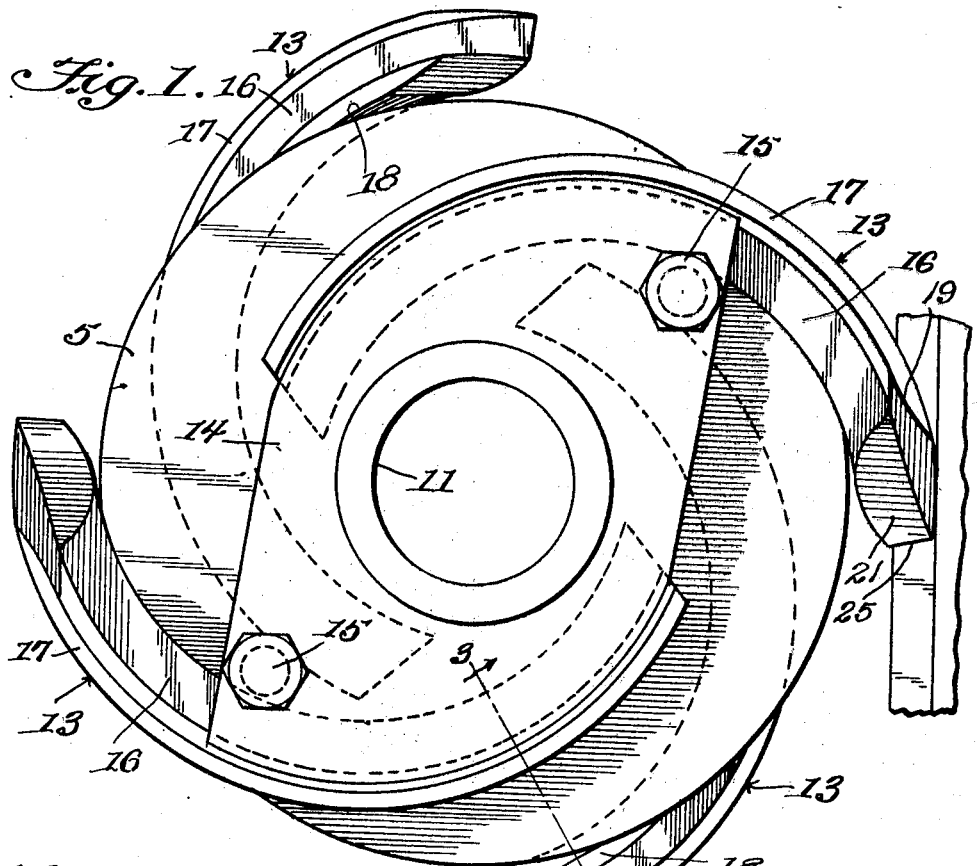
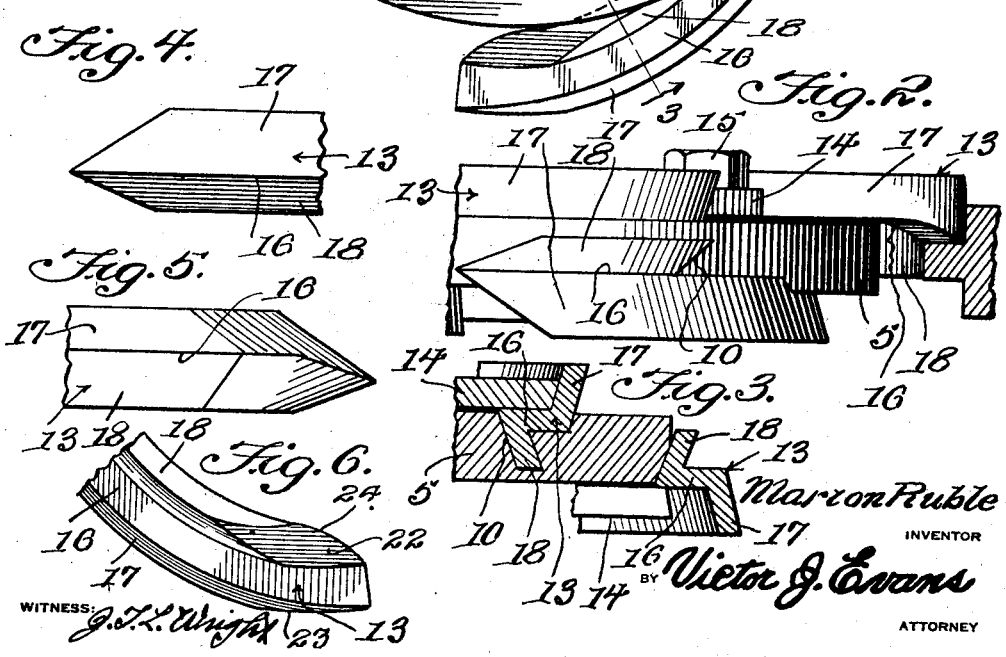

Patented Mar. 16, 1926.

1,576,676

UNITED STATES PATENT OFFICE.

MARION RUBLE, OF PORTLAND, OREGON.

CUTTER.

Application filed March 23, 1925. Serial No. 17,745.

*To all whom it may concern:*

Be it known that I, MARION RUBLE, a citizen of the United States, residing at Portland, in the county of Multnomah and State of Oregon, have invented new and useful Improvements in Cutters, of which the following is a specification.

My invention relates to wood working cutters and its principal object is to provide a cutter which embodies a plurality of cutting blades designed to produce a draw cut and thereby do smoother work, particularly against the grain or in refactory grained stock.

The invention also contemplates a cutter embodying a cutter head and a plurality of cutting knives or blades associated therewith which are associated with the cutter heads in a novel manner so that they can be readily removed from the heads for the purpose of sharpening or inserting new blades.

With the preceding and other objects and advantages in mind, the invention consists in the novel combination of elements, construction and arrangement of parts and operations to be hereinafter specifically referred to, claimed and illustrated in the accompanying drawings, wherein:

Figure 1 is a side elevation of a cutter head and blade constructed in accordance with my invention, one of the blades being shown in the act of engaging a length of wood.

Figure 2 is an edge elevation of the device having parts broken away.

Figure 3 is a transverse sectional view taken on line 3—3 of Figure 1.

Figure 4 is an elevation of one of the cutting blades.

Figure 5 is a similar view showing the reverse edge of the cutting blade.

Figure 6 is a side elevation of the cutting blade.

Referring to the drawings in detail wherein corresponding characters of reference denote corresponding parts throughout the several views, the numeral 5 designates a disk or cutter head provided with substantially L-shaped in cross section and longitudinally curved grooves 10 upon its opposite faces which extend from a point adjacent the axes 11 of the cutter head to the periphery thereof. Retained in each of the grooves 10 is a cutter blade 13, while plates 14 are disposed upon the opposite faces of these disks or cutter heads and retain the blades in position. Bolts 15 pass transversely through the plates and cutter head and are provided with nuts for holding the parts assembled.

In connection with the cutters I wish to emphasize that these cutters are of novel construction and that all of these cutters are identical and a detail description of one will apply to all. This cutting blade is substantially arcuate shaped in configuration and comprises a web or body 16 having oppositely extending flanges 17 and 18. The flange 18 is of less size than the flange 17 but is approximately the same length and both of the flanges follow the curvature of the web and extend at an angle from the web. As shown in Figure 3, the flange 18 is accommodated in the base of the L-shaped groove 10 while the web 16 is accommodated within the other branch of the L-shaped groove as shown. The plates or disks 14 contact with the web 16 and abut the inner face of the flange 17. As illustrated in Figures 1, 5 and 6, the inner face of the flange 17, the outer face of the flange 18 and the inner face of the web 16 of each blade is beveled to the forward end of the blade as shown at 19, 20 and 21 respectively, and the forward edges of the flanges as shown at 23 and 24 respectively are beveled at different angles from the forward ends of these flanges to the outer edges thereof while the forward edge of the web 16 is straight as shown at 25.

Due to the configuration of these flanges and web it will be observed that the point of the cutter will be cutting while the heels are approaching the wood and emerging from the wood while the heels are still cutting and thereby avoiding the hammering of the cutting edges which is incident to blades having straight edges. Such hammering would tend to jar the stock and thereby cause the latter to "rough". Moreover, my type of cutter will throw the shavings to one side where the fans will carry them away.

While I have shown and described the preferred embodiment of the invention, I desire to have it understood that such changes may be made in the form, construction, arrangement of parts and operations, as will not depart from the spirit of the invention or the scope of the subjoined claims.

What is claimed is:—

1. A device of the character described comprising a body having substantially L-shaped in cross section longitudinally curved grooves, a blade in each groove including a web, a flange carried thereby and received in the groove, a second flange extending from the web, the ends of such flanges being beveled in different planes.

2. A device of the character described comprising a rotatable cutter head having longitudinal grooves in its opposite faces, longitudinally curved cutting blades, each of which comprising a web, a flange carried by one end and accommodated in the groove, a second flange extending from the web, the ends of the flanges being beveled in different planes and means for fastening the first mentioned flanges in the grooves.

In testimony whereof I affix my signature.

MARION RUBLE,